United States Patent Office 3,219,190
Patented Nov. 23, 1965

3,219,190
DEVICE FOR COLLECTING FLOTSAM, ESPECIALLY WASTE OIL SPILLAGE ON A WATER SURFACE
Trygve Fridtjof Arnt Thune, Hausmannsgt. 6, Oslo, Norway
Filed Aug. 31, 1962, Ser. No. 220,829
Claims priority, application Norway, Nov. 16, 1961, 142,198; Mar. 26, 1962, 143,796
8 Claims. (Cl. 210—242)

This invention relates generally to anti-pollution apparatus and more particularly to a new and improved apparatus for removing oil and flotsam from the surface of water. Waste oil, but also other flotsam on the surface of water is difficult to remove because it floats and spreads on the water as a thin layer or film. A known method of removing oil spillage is to encircle the oil on the surface by means of an oil boom which is swept over the water when pulled between two tow-boats. When all the oil has been collected in this way the oil boom is puckered up thereby concentrating the layer of oil so that it may more easily be baled or pumped into an accompanying boat. However, the amount of water in the oil and water mixture which is removed in this way, is very great. Other methods have, therefore, been tried, such as to arrange containers which are lowered to such a depth that the oil may flow over the edge and into the container, from which it may then be pumped. Also in this case the mixture will comprise mainly water and for this reason this method has not been successful due to the fact that the slightest movement causes one edge of the container to dip over and under the surface of the water, and in many cases it will ge too far under the surface so that it will be mainly water which is filled into the container.

The present invention aims at solving this problem by skimming the oil spillage or other flotsam from the water surface and delivering it into a separator vessel which may be manoeuvered in the spillage area to sweep the water surface. More precisely the device according to the invention consists in a sea-going vessel for separating liquids and materials of different densities from the surface of a body of water usable for removing oil and flotsam from the surface of the water and having a skimming board of spadeform moved against the oil spillage so that the same, due to the relative movement, is guided, together with a certain amount of water, rearwardly into a chamber of the vessel. The bottom of this chamber is open and in communication with the water in which the vessel is in use to allow the water to escape, and in the upper part of the chamber oil is collected in an oil collector and later removed therefrom.

By means of this arrangement not only an oilfilm floating on the water is skimmed off in an efficient way but the oil is concentrated in the said chamber to such a degree that separation of the oil from the water may be obtained and only a very small amount of water, if any at all, is in the collected oil when it is removed by pumping.

The vessel is preferably designed as a barge with a flat bottom and square bow open along a portion thereof with the inclined skimming board disposed at the bow; the lower end of the skimming board and a front inclined portion of the bottom define a horizontal leading edge at a suitable depth under the water surface at the open bow portion.

This embodiment of the device is especially efficient for separating oil and water.

The embodiment just described will only operate when the vessel is moved against the oil spillage. However, according to a further development of the invention it is possible to make the operation independent of the movement of the vessel, and according to the invention there is arranged, over the inclined skimming board means to urge the flow of water with lesser density contaminants therein over the skimming board and comprising a paddle wheel. The paddles of the wheel reach down in the water and will, when rotated, urge the oil and water mixture over the rear edge (weir crest) of the skimming board independently of the movement of the vessel.

The advantage thereby obtained is that the vessel may lie at rest while recovering the oil or flotsam which is fenced in by an oil boom, such as in the form of a watertight canvas standing in the water. The vessel is either situated in the contaminated area fenced in by oil booms or connected at its bow with the two ends of one or more lengths of oil booms.

According to still another feature of the invention the upper wide part of an oil collector comprising a collecting funnel is formed substantially in the above-mentioned chamber and occupies most of the same at the water level. The oil will therefore float on a smaller area, and this will minimize the amount of water flowing over the edge of the funnel together with the oil.

The invention will now be explained in detail with reference to the drawings, in which FIG. 1 shows a longitudinal vertical section of the vessel, designed as a barge;

Figure 1:
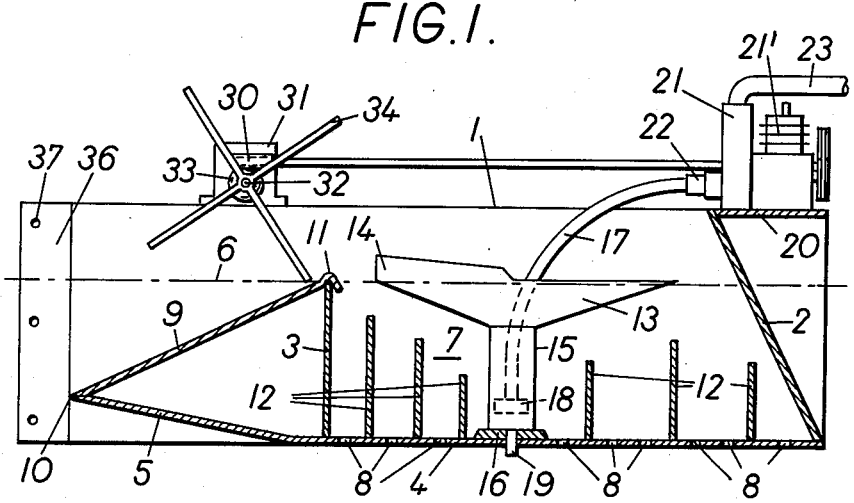

The oil recovery and separator according to the drawings, consists of two water proof pontoons 1 of substantially prismatic form with one somewhat flattened edge underneath the water and the opposite horizontal wall above the water surface. The vessel has an open bow between the two pontoons. A perforated bottom plate 4 is fastened between the two pontoons along their bottom edges. The front portion 5 of the bottom plate 4 is inclined downwardly and rearwardly between the pontoons toward the bottom at the stern of the vessel is placed a plate 2 which is inwardly inclined to minimize the ripple of the water.

From the upper part of the bow bottom plate 5 and back- and upwardly is arranged a plate 9 forming an inclined skimming board forming together with the plate 9 at the open bow a horizontal, relatively sharp leading edge 10 at a suitable depth under the water surface indicated by the dotted line 6. The rear part of the plate 9 is situated above the water level and is formed as a weir crest over which the oil and water mixture must be pushed over in order to enter an inner chamber 7 which is defined by the rear plate 2, the pontoons 1, the perforated bottom 4 and a transverse bulkhead 3 defining a weir at the top edge of which the rear, bent edge of the skimming board 9 rests. This bulkhead 3 is fixed between the bottom 4 and the pontoons 1 in a watertight manner so that a chamber formed by the bulkhead 3, the pontoons 1 and the portion 5 of the bow may be used for trimming purposes. The skimming board extends transversely of the hull of the vessel and is inclined downwardly and forwardly from an upper end of the weir toward said open bow at a suitable angle as shown and has a suitable fore and aft length as shown. The chamber 7 will receive the oil-water mixture which is skimmed by the skimming board 9 and delivered over the weir crest 11. When a barge of the above mentioned design is moved forward against the oil spillage the oil and water mixture will be skimmed along a band corresponding in width to the width of the barge, and delivered backwards over the skimming board into the chamber 7. The water will escape through the holes 8 in the bottom 4, while the oil which is of lesser density than water will gather at the top.

A device of this type will overcome the limitations of the known craft and the oil may now be pumped from the barge after a certain amount of oil has been gathered, and the sweeping may then continue. However, it would be of advantage to pump the oil during the sweeping to achieve continuous operation. The invention provides for continuous operation thus in the middle of the chamber 7 there is, therefore, arranged an oil collector or separator device 13 consisting of a funnel resting on a short piece of pipe 15 seated on a spacer or disk 16 having an aperture through which a pin 19 extends and insures the funnel is fastened to the bottom 4. In order to remove oil collected from the collector a suction head 18 is introduced into the pipe 15. The suction head is connected with a tube or hose 17, the upper end of which is connected with an intake 22 of a pump 21 for pumping out the collector.

The collector funnel 13 defines a mouth for the collector and has an upper front edge equipped with an upwardly extending shield 14 defining a leading edge of the mouth above the water level 6 in order to avoid the oil-water mixture entering the chamber from flowing directly over the mouth of the funnel. The funnel 13 had an after edge on the mouth thereof disposed substantially at the surface of the water in the chamber 7. The oil-water mixture will, therefore, flow over the rear or after edge of the funnel only. This rear edge is at water level or slightly above or underneath it depending on the expected oil concentration thereby to allow only flotsam, and other materials comprising oil and the like on the surface of the water to enter the collector. Due to the forward motion of the barge an accumulation of water will occur, and one may therefore obtain the required liquid level in the chamber 7 by choosing an appropriate speed. Furthermore, by means of special trimming tanks or ballast tanks the level of the funnel after edge in relation to the water level may be adjusted. As trimming tanks may be used the above mentioned chamber defined by members 1, 3 and 5, as well as both pontoons 1.

Of course, it is also possible to arrange means for adjusting the height of the funnel 13.

FIG. 1 also shows a certain number of transverse bulkheads 12 which rise from the perforated bottom 4 up to different heights under the water level 6, and which will in known ways slow down and calm the liquid flow in the chamber 7, thereby allowing the oil and water to separate more readily. The funnel shaped oil separator or collector device 13 is shown formed with a rectangular opening which at water level occupies most of the chamber 7. Thereby the oil will concentrate on a smaller area between the funnel opening and the walls of the chamber 7.

Figure 2:
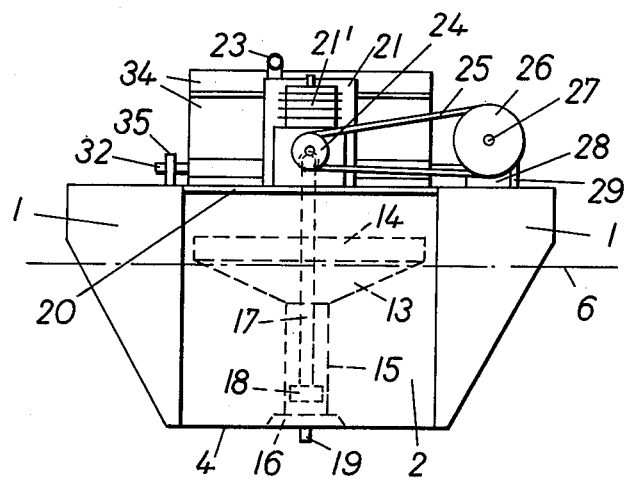
FIG. 2 is a rear end view of the vessel in FIG. 1.

Furthermore, FIGS. 1 and 2 show a bridge 20 which is inserted between the upper horizontal portions of the pontoons 1 and the rear cross bulkhead 2. This bridge serves as a support for a motor-pump-unit 21', 21. A pipe or a hose 23 is connected to the pump outlet and leads to a settling tank on an accompanying boat, see FIGS. 4 and 5, which show accompanying or towing boats.

The motor 21' not only drives the pump 21 but also a shaft 32 with paddles 34, a belt wheel 24 fixed to the motor shaft, over a belt 25 and a sheave 26 driving a shaft 27 which is disposed above and parallel to one of the pontoons 1. The rear end of the shaft 27 is supported in a bearing block 28, 29, and the front end, which is equipped with a worm 30, is supported in a bearing block 31. The worm 30 drives a worm wheel 33 on the shaft 32 which is placed across the top of the vessel and carries a number of paddles 34 which reach or extend partly under the water level 6. One end of the shaft 32 is supported in the bearing block 31, and the other end is supported in a bearing block 35 fastened to the top of the other of the pontoons 1.

When the motor rotates, the paddles 34 are rotated in the direction of the arrow to thereby lead oil and water over the weir crest 11 and into the chamber 7 in which the oil layer will grow in thickness, thereby allowing the oil to be separated by means of the funnel shaped separator or collector device 13.

Figure 4:
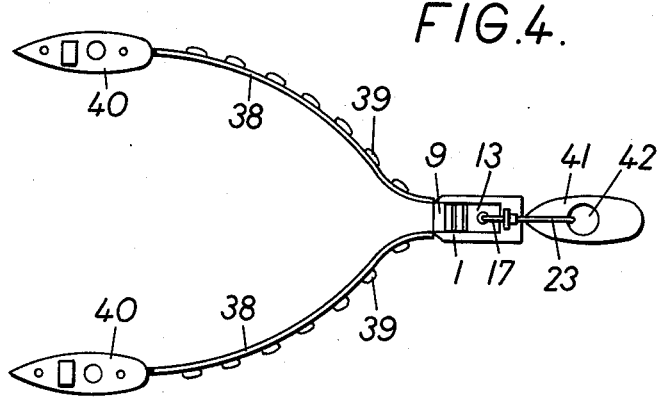
FIG. 4 is a plan view of the vessel connected between two oil booms sweeping the surface of a body of water and FIG. 5 is a plan view of the vessel of FIG. 1 tied to a boat with a container for the oil collected.

FIG. 4 shows how the device according to the invention may be used together with a couple of oil booms 38 which are pulled by two boats 40. These oil booms are of known design and consist of a water proof "fence" which stands vertically in the water, stabilized by weights and floats 39 which insure a correct height in the water.

Figure 3:
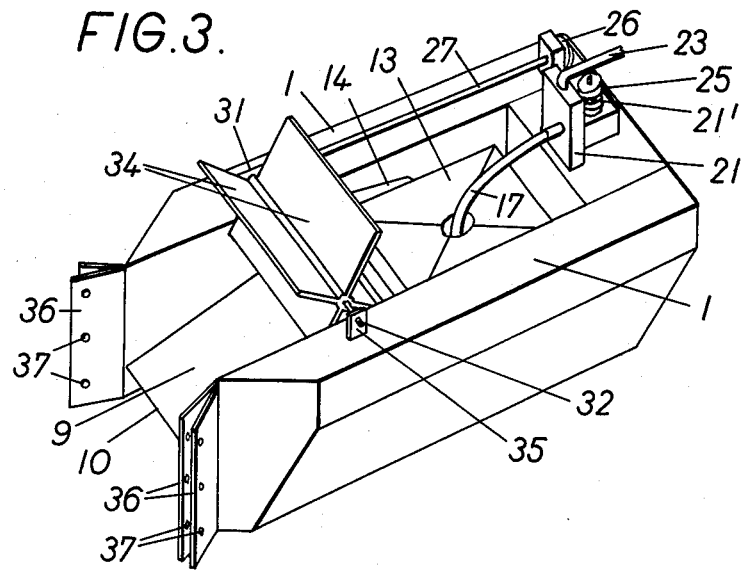
FIG. 3 is a perspective view of the vessel in FIG. 1.

In FIGS. 1 and 3 are shown two pairs of flanges or flaps 36 between which the ends of the oil boom may be clamped. The flaps are secured to the bow shaped front ends of the pontoons 1 and are provided with a number of registering holes 37 for bolts so as to clamp fast the oil booms 38 in a watertight manner.

Furthermore, FIG. 4 shows a boat 41 with a settling tank 42 for the recovered oil and towed by the oil recovery and collector vessel. The pump 21', shown in FIGS. 1, 2 and 3, is driven when the device is hauled by two oil booms 38, as shown in FIG. 4. In this case the paddle wheels 33, 34 need not be rotated since the boats 40 will take care of the necessary relative movement between the oil floating on the water and the barge according to the invention and the booms 38 will lead the oil to the skimming board 9 and over the rear edge of the same, i.e., their weir crest 11.

The pump 21' pumps the oil from the funnel 13, 15 through the pipe or hose 17 connected between the suction head 18 and the pump suction line 22, through pump 21', out through the outlet line 23 and finally through a flexible tube 23 leading down to the settling tank 42.

It is also possible to sweep the area where oil is spilled with just one boat 40, a certain length of an oil boom 38 and the barge according to the invention with the barge having a suitable rudder, not shown, arranged to act as a paravane holding the oil boom 38 out from the side of the boat 40, and catching the oil.

Figure 5:
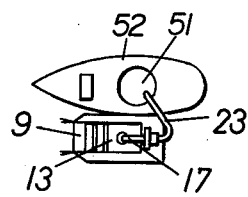

FIG. 5, finally, shows another use, the barge being tied to an accompanying towing boat 51 having an oil tank 52 which is via a flexible tube 23 connected with the pump aggregate 21', 21 on the barge to pump the oil into the settling tank 52 on the boat 51. In this case the barge may be moved with an area which is either encircled by an oil boom or by a shore and an oil boom to collect the oil within said area. For this purpose there may be fixed to the bow of the barge two diverging collecting boards, not shown, clamped fast between either or both of the pairs of flaps 36 at the front of the barge, FIG. 3. The flaps are provided with apertures 37 for securing of the collecting boards.

As already mentioned above, the device according to the invention may be used not only for collecting and recovering waste oil, but also for other flotsam on the water, such as pieces of wood, saw dust and other goods.

What I claim is:

1. A vessel for separating liquids and materials of different densities from the surface of a body of water usable for removing oil and flotsam from the surface of the water comprising, a hull having a chamber and a bow open along a portion thereof to provide communication between said chamber and the water, means defining a weir interiorly of said hull forward of said chamber, means defining a skimming board disposed transversely of the hull inclined downwardly and forwardly from an upper end of said weir and extending downwardly and forwardly toward said bow, said skimming board having a leading edge along said open bow, means in said hull for determining the depth of said hull in said water thereby to determine the depth of said skimming board beneath the surface of the water in operation to allow flow of water over said board and said weir into said chamber, said hull having means defining a bottom on said chamber providing communication with the water in which said vessel is in use, and an oil collector in said chamber having means defining a mouth for said collector having a leading edge disposed above the surface of the water and other materials comprising oil and the like in said chamber and an after edge disposed substantially at the surface of the water in said chamber to allow substantially only said other materials comprising oil and the like on the surface of the water in said chamber to enter said collector.

2. A vessel for separating liquids and materials of different densities from the surface of a body of water usable for removing oil and flotsam from the surface of the water comprising a hull having a chamber and a bow open along a portion thereof to provide communication between said chamber and the water, means defining a weir interiorly of said hull forward of said chamber, means defining a skimming board disposed transversely of the hull inclined downwardly and forwardly toward said bow, said skimming board having a leading edge along said open bow, means in said hull comprising ballast tanks for determining the depth of said hull in said water thereby to determine the depth of said skimming board beneath the surface of the water in operation to allow flow of water over said board and said weir into said chamber, said hull having means defining a bottom on said chamber providing communication with the water in which said vessel is in use, and an oil collector in said chamber having means defining a mouth for said collector having a leading edge disposed above the surface of the water and other liquid materials in said chamber and an after edge disposed substantially at the surface of the water in said chamber to allow said liquid materials on the surface of the water in said chamber to enter said collector.

3. A vessel for separating liquids and materials of different densities from the surface of a body of water usable for removing oil and flotsam from the surface of the water comprising a hull having a chamber and a bow open along a portion thereof to provide communication between said chamber and the water, means defining a weir interiorly of said hull forward of said chamber, means defining a skimming board disposed transversely of the hull inclined downwardly and forwardly from an upper end of said weir and extending downwardly and forwardly toward said bow, said skimming board having a leading edge along said open bow, means in said hull for determining the depth of said hull in said water thereby to determine the depth of said skimming board beneath the surface of the water in operation to allow flow of water over said board and said weir into said chamber, said hull having means defining a bottom on said chamber providing communication with the water in which said vessel is in use, an oil collector in said chamber having means defining a mouth for said collector having a leading edge disposed above the surface of the water and other liquid materials in said chamber and an after edge disposed substantially at the surface of the water in said chamber to allow only said other materials on the surface of the water in said chamber to enter said collector, and means to urge the flow of water with lesser density contaminants therein over said skimming board and weir.

4. A vessel according to claim 3, in which the last mentioned means comprises a rotatably driven paddle wheel.

5. A vessel for separating liquids and materials of different densities from the surface of a body of water usable for removing oil and flotsam from the surface of the water comprising, a hull having a chamber and a bow; open along a portion thereof to provide communication between said chamber and the water, means defining a weir interiorly of said hull forward of said chamber, means defining a skimming board disposed transversely of the hull inclined downwardly and forwardly from an upper end of said weir and extending downwardly and forwardly toward said bow, said skimming board having a leading edge along said open bow, means in said hull for determining the depth of said hull in said water thereby to determine the depth of said skimming board beneath the surface of the water in operation to allow flow of water over said board and said weir into said chamber, means in said chamber to calm the water therein to improve separation of the water and other materials of lesser density therein, said hull having means defining a bottom on said chamber providing communication with the water in which said vessel is in use, and an oil collector in said chamber having means defining a mouth for said collector having a leading edge disposed above the surface of the water and other liquid materials in said chamber and an after edge disposed substantially at the surface of the water in said chamber to allow said liquid materials on the surface of the water in said chamber to enter said collector, and means to urge flow of water with lesser density contaminants therein over said skimming board and weir.

6. A vessel for separating liquids and materials of different densities from the surface of a body of water usable for removing oil and flotsam from the surface of the water comprising a hull having a chamber and a bow open along a portion thereof to provide communication between said chamber and the water, means defining a weir interiorly of said hull on a forward end of said chamber, means defining a skimming board disposed transversely of the hull inclined downwardly and forwardly from an upper end of said weir and extending downwardly and forwardly toward said bow, said skimming board having a leading edge along said open bow, means in said hull for determining the depth of said hull in said water thereby to determine the depth of said skimming board beneath the surface of the water in operation to allow flow of water over said board and said weir into said chamber, means in said chamber to calm the water therein to improve the separation of the water and other materials of lesser density therein, said hull having means defining a bottom on said chamber providing communication with the water in which said vessel is in use, and an oil collector in said chamber having means defining a mouth for said collector having a leading edge disposed above the surface of the water and other liquid materials in said chamber and an after edge disposed substantially at the surface of the water in said chamber to allow said liquid materials on the surface of the water in said chamber to enter said collector.

7. A vessel for separating liquids and materials of different densities from the surface of a body of water usable for removing oil and flotsam from the surface of the water comprising a hull having a chamber and a bow open along a portion thereof to provide communication between said chamber and the water, means defining a weir interiorly of said hull forward of said chamber, means defining a skimming board disposed transversely of said hull inclined downwardly and forwardly toward said bow, said skimming board having a leading edge along said open bow, means in said hull comprising ballast tanks for determining the depth of said hull in said water thereby to determine the depth of said skimming board beneath the surface of the water in operation to allow flow of water over said board and said weir into said chamber, means in said chamber to calm the water therein to improve separation of the water and other materials of lesser density therein, said hull having means defining a bottom on said chamber providing communication with the water in which said vessel is in use, an oil collector in said chamber having a leading edge disposed above the surface of the water and other liquid materials in said chamber and an after edge disposed substantially at the surface of the water in said chamber to allow substantially only said other liquid materials on the surface of the water in said chamber to enter said collector, and means to urge the flow of water with lesser density contaminants therein over said skimming board and weir.

8. A vessel for separating liquids and materials of different densities from the surface of a body of water usable for removing oil and flotsam from the surface of the water comprising a hull having a chamber and a bow open along a portion thereof to provide communication between said chamber and the water, means defining a weir interiorly of said hull forward of said chamber, means defining a skimming board disposed transversely of said hull inclined downwardly and forwardly toward said bow, said skimming board having a leading edge along said open bow, means in said hull comprising ballast tanks for determining the depth of said hull in said water thereby to determine the depth of said skimming board beneath the surface of the water in operation to allow flow of water over said board and said weir into said chamber, means in said chamber to calm the water therein to improve separation of the water and other materials of lesser density therein, said hull having a bottom defining a bottom on said chamber providing communication with the water in which said vessel is in use, an oil collector in said chamber having a leading edge disposed above the surface of the water and other liquid materials in said chamber and an after edge disposed substantially at the surface of the water in said chamber to allow substantially only said other liquid materials on the surface of the water in said chamber to enter said collector, and boom means to collect and urge contaminants of lesser density on the surface of the water toward said skimming board during forward travel of said vessel.

References Cited by the Examiner

UNITED STATES PATENTS

| | | | |
|---|---|---|---|
| 61,880 | 2/1867 | Serrell | 210—242 |
| 727,807 | 5/1903 | King | 56—8 |
| 911,314 | 2/1909 | Maranville | 210—540 |
| 1,530,078 | 3/1925 | Haynes | 210—242 |
| 1,573,085 | 2/1926 | Meiani | 210—242 |
| 1,591,024 | 7/1926 | Dodge | 210—242 |
| 2,876,903 | 3/1959 | Lee | 210—242 |
| 2,908,393 | 10/1959 | Lanphier | 210—242 |

REUBEN FRIEDMAN, *Primary Examiner.*

GEORGE D. MITCHELL, ROBERT E. BURNETT,
*Examiners.*